(12) United States Patent
Noll et al.

(10) Patent No.: US 8,534,599 B2
(45) Date of Patent: Sep. 17, 2013

(54) REDUNDANT TWO STAGE ELECTRO-HYDRAULIC SERVO ACTUATOR CONTROL

(75) Inventors: Christopher Noll, Glastonbury, CT (US); Steven A. Avritch, Bristol, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 215 days.

(21) Appl. No.: 13/076,702

(22) Filed: Mar. 31, 2011

(65) Prior Publication Data

US 2012/0253556 A1   Oct. 4, 2012

(51) Int. Cl.
*B64C 9/00* (2006.01)

(52) U.S. Cl.
USPC .......... 244/99.2; 701/36; 244/99.3; 244/99.4; 244/175; 244/212

(58) Field of Classification Search
None
See application file for complete search history.

(56) References Cited

U.S. PATENT DOCUMENTS

| | | | |
|---|---|---|---|
| 4,472,780 A * | 9/1984 | Chenoweth et al. | 701/4 |
| 4,633,473 A | 12/1986 | Ratchford et al. | |
| 4,649,484 A * | 3/1987 | Herzog et al. | 701/3 |
| 4,759,515 A * | 7/1988 | Carl | 244/76 R |
| 4,771,427 A | 9/1988 | Tulpule et al. | |
| 4,807,516 A | 2/1989 | Takats | |
| 4,887,214 A * | 12/1989 | Takats et al. | 701/3 |
| 5,202,679 A | 4/1993 | Tulpule et al. | |
| 5,274,554 A * | 12/1993 | Takats et al. | 701/29.2 |
| 5,493,497 A * | 2/1996 | Buus | 701/4 |
| 5,515,282 A * | 5/1996 | Jackson | 701/4 |
| 5,531,402 A * | 7/1996 | Dahl | 244/99.2 |
| 5,670,856 A * | 9/1997 | Le et al. | 318/564 |
| 5,806,805 A * | 9/1998 | Elbert et al. | 244/195 |
| 6,389,335 B1 * | 5/2002 | Vos | 701/4 |
| 6,622,972 B2 * | 9/2003 | Urnes et al. | 244/194 |
| 6,882,889 B2 | 4/2005 | Fuller et al. | |
| 6,923,405 B2 * | 8/2005 | Cline et al. | 244/99.4 |
| 7,017,861 B1 * | 3/2006 | Johansson et al. | 244/194 |
| 7,474,944 B2 | 1/2009 | Cartmell et al. | |
| 7,549,605 B2 * | 6/2009 | Hanlon et al. | 244/75.1 |
| 7,600,715 B2 * | 10/2009 | Matsui | 244/99.6 |
| 7,693,616 B2 | 4/2010 | Beutler et al. | |
| 7,770,842 B2 * | 8/2010 | Benson | 244/75.1 |
| 7,789,345 B2 | 9/2010 | Matsui et al. | |
| 8,209,069 B1 * | 6/2012 | McLoughlin et al. | 701/11 |
| 8,235,328 B2 * | 8/2012 | Hirvonen | 244/194 |
| 8,340,842 B2 * | 12/2012 | Ausman et al. | 701/9 |
| 2005/0022590 A1 * | 2/2005 | Huynh | 73/170.02 |
| 2009/0125166 A1 * | 5/2009 | Johnson et al. | 701/3 |

(Continued)

*Primary Examiner* — Thomas Tarcza
*Assistant Examiner* — Richard Goldman
(74) *Attorney, Agent, or Firm* — Carlson, Gaskey & Olds, P.C.

(57) ABSTRACT

A flight control system includes a dual stage actuator for moving a control surface. Each stage includes several control valves that are controlled independently to provide a desired redundancy. A flight controller generates a position command that is indicative of the position desired for the control surface. A first communication link is provided between several flight controllers to share information. Each of the flight controllers forwards the position command to actuator remote processing unit. The actuator remote processing unit receives position commands and generates a command signal that controls movement of the actuator using the control valves. Each of the actuator remote processing units is linked through a second communication link. Feedback and balancing of the different control valves is provided by the visibility accorded each actuator remote processing unit by the second communication link.

12 Claims, 1 Drawing Sheet

(56) References Cited

U.S. PATENT DOCUMENTS

| | | | |
|---|---|---|---|
| 2009/0152404 A1* | 6/2009 | Yount et al. | 244/194 |
| 2009/0302171 A1* | 12/2009 | Wilkens | 244/223 |
| 2010/0116929 A1* | 5/2010 | Hejda | 244/99.4 |
| 2011/0066305 A1* | 3/2011 | Lin et al. | 701/3 |
| 2012/0290153 A1* | 11/2012 | Olsoe et al. | 701/3 |

* cited by examiner

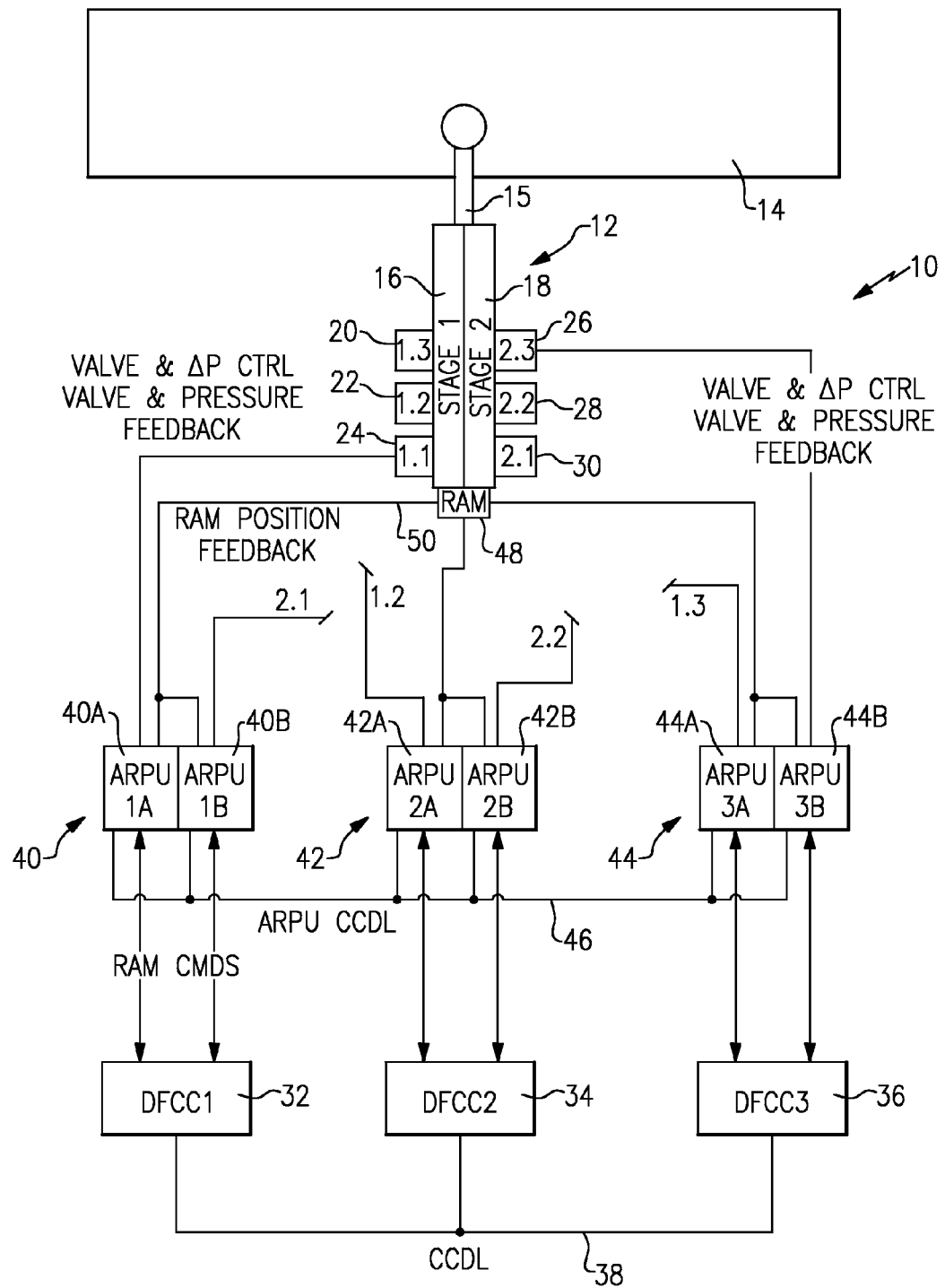

REDUNDANT TWO STAGE ELECTRO-HYDRAULIC SERVO ACTUATOR CONTROL

BACKGROUND

This disclosure generally relates to fly by wire flight control systems. More particularly, this disclosure relates to a triplex flight control architecture including dual stage actuators.

A flight control system translates a pilot's input into signals that control actuators. The signals to the actuators provide for movement of a corresponding control surface to execute the commands desired by the pilot. Fly by wire systems included redundant systems such that control of the aircraft is maintained in the event of a system fault. Typical redundant systems include several controllers that independently receive information and provide output signals to generate the desired actuator operation. Feedback utilized for control is therefore provided through each independent controller. Moreover, a failure or aberrant operation in one of the individual actuators is not detected by the other controllers.

SUMMARY

A disclosed flight control system includes a dual stage actuator with triplex control valves for moving a control surface. Each stage includes several control valves that are controlled independently to provide a desired redundancy. A flight controller generates a position command that is indicative of the position desired for the control surface. A first communication link is provided between several flight controllers to share information. Each of the flight controllers forwards the position command to an actuator remote processing unit. The actuator remote processing unit receives position commands and generates a command signal that controls movement of the actuator using the control valves. Each of the actuator remote processing units is linked through a second communication link. Feedback and balancing of the different control valves is provided by the visibility accorded each actuator remote processing unit by the second communication link.

The second data link communicates all the information that is received at one actuator remote processing unit with each of the other actuator remote processing units. This sharing and visibility of information further provides built in fault and test functionality. Pressures, differences in pressure between all of the control valves are thereby compared and a faulty control valve can be identified if desired values as compared to the other control valves are outside of defined tolerances. Moreover, the second data link between remotely located actuator remote processing units enables a sharing of information at higher rates and provides increased functionality even in the event of an individual failure. Moreover, the improved control architecture enables improved pressure balancing between the two stages at a higher rate and efficiency.

These and other features disclosed herein can be best understood from the following specification and drawings, the following of which is a brief description.

BRIEF DESCRIPTION OF THE DRAWING

The FIGURE is a schematic view of an example flight control system.

DETAILED DESCRIPTION

Referring to the FIGURE, an example flight control system is schematically shown and indicated at 10. The example flight control system 10 includes a dual stage actuator 12 with electro-hydraulic servo control valves (EHSVs or control valves) 20, 22, 24, 26, 28 and 30 for moving a control surface 14. The dual stage actuator 12 includes a first stage 16 and a second stage 18. Stages 16 and 18 include control valves 20, 22, 24, 26, 28, 30 that are controlled independently to provide a desired redundancy.

The first stage 16 includes the control valves 20, 22 and 24 and the second stage 18 includes control valves 26, 28 and 30. Each of the control valves are controlled by a separate actuator remote processing unit. The example flight control system 10 is known as a triplex flight control system and thereby includes three separate independently operable controllers that control operation of the dual stage actuator 12.

The example control system 10 includes a first flight controller 32, a second flight controller 34 and a third flight controller 36. Each flight controller 32, 34, 36 is mounted in a location remote from the actuator 12. The flight controllers 32, 34, and 36 generate a position command that is indicative of the position desired for the control surface 14. The position command can be either an analog signal or a digital representation of a desired value. A first communication link 38 is provided between the flight controllers 32, 34 and 36. Information from each of the flight controllers 32, 34, and 36 is shared across the communication link 38.

The position command generated by each of the flight controllers 32, 34, and 36 is sent to a corresponding pair of actuator remote processing units 40, 42, and 44. Accordingly, in this example a first actuator remote processing unit 40 receives position commands from the first flight controller 32, a second actuator remote processing unit 42 receives position commands from the second flight controller 34, and a third actuator remote processing unit 44 receives position commands from the third flight controller 36.

Each of the actuator remote processing units 40, 42, and 44 are mounted remotely from the corresponding flight controllers 32, 34 and 36 and close to the actuator 12. This provides for a decreased and relatively short physical connection to the actuator 12. The actuator remote processing units 40, 42 and 44 are all linked by way of a second cross channel communication link 46.

A position sensor 48 is disposed at the actuator 12 that provides a feedback of an actual position of a ram 15 of the actuator 12 through feedback loop 50 to each of the actuator remote processing units 40, 42, and 44. The actuator ram 15 is the piston that moves out of the actuator 12. The position sensor 48 measures the physical position of the ram 15. Each of the actuator remote processing units 40, 42, and 44 forward information through to the corresponding flight controller 32, 34 and 36.

Each of the actuator remote processing units 40, 42 and 44 include a pair of actuator remote processing units that each control one of the control valves 20, 22, and 24 of the first stage 16 and one of the control valves 26, 28, and 30 of the second stage 18.

Accordingly, the first actuator remote processing unit 40 includes a pair of actuator remote processing units 40A and 40B, where the actuator remote processing unit 40A controls the control valve 24 of the first stage 16 and the actuator remote processing unit 40B controls the control valve 30 of the second stage 18. The second and third actuator remote processing units 42 and 44 further include pairs of actuator remote processing units 42A, 42B and 44A, and 44B. Each one of the pairs of actuator remote processing units controls one of the control valves for each of the first and second stages 16 and 18. The example triplex control provides the desired redundancies that enable operation with less than all of the flight controllers 32, 34 and 36 and actuator remote processing units 40, 42, and 44 operating optimally.

In operation, each of the flight controllers 32, 34 and 36 generate a position command that is indicative of a desired position of the control surface 14. The example control surface 14 can be a flap, rotor, rudder, or any other control surface that is positioned to effect a desired movement and orientation of an aircraft. The position command is determined based on input from a pilot regarding a desired movement of the aircraft. The position command is sent from the flight controller 32, 34 and 36 to a corresponding one of the actuator remote positioning units 40, 42 and 44. The corresponding actuator remote positioning unit 40, 42 and 44 utilizes the position command to generate a command to the corresponding one of the control valves 20-30 to cause the actuator 12 to move to a desired position.

In this example, each of the EHSVs 20-30 are proportional hydraulic valves that provide a pressure difference that causes movement and positioning of the actuator 12 to a desired position. A pressure difference or pressure value is feedback to each of the actuator remote processing units 40, 42 and 44 along with a position value from the actuator ram 15 using position sensor 48. In this example, the position sensor 48 comprises a linear variable displacement transducer (LVDT) for providing positional feedback that is utilized by the actuator remote processing units 40, 42 and 44 in determining if adjustment to the commands are required.

Each of the control valves 20-30 operates slightly differently and therefore a balancing between each of the control valves 20-30 is performed to prevent wide variances in pressure between control valves 20-30 within a common stage or that may act counter to the other control valves. The balancing of commands across each of the actuator remote processing units 40-44 is possible because pressure data that is provided from each of the control valves 20-30 is shared across the second data link 46. Therefore, each of the actuator remote processing units 40, 42 and 44 has access to data feedback from all of the control valves 20-30, not just those control valves controlled by that particular actuator remote processing unit.

Moreover, the feedback and balancing that can be performed across the actuator remote processing units 40, 42 and 44 is accomplished separate from the flight controllers 32, 34, and 36. Accordingly, the flight controllers 32, 34 and 36 provide positional information and the actuator remote processing units 40, 42 and 44 generate commands to the actuator 12 for attaining that desired position in view of feedback from the control valves 20-30 and the position sensor 48. Moreover, the actuator remote processing units 40-44 adjust the commands independent of the flight controllers 32, 34 and 36 responsive to the feedback provided by all of the control valves 20-30 and the position sensor 48.

Additionally, the example flight control system 10 provides an increased robustness in operation as the information sharing across the second link 46 increases access links through which information may be shared. For example, during operation of the feedback link 50 providing information from the position sensor 48 fails with regard to the first actuator remote processing unit 40, that information will be provided and visible to the first actuator remote processing unit 40 through the second data link 46. Accordingly, instead of shutting operation of the first actuator remote processing unit 40 down due to the absence of information required to generate a desired command, the information can be attained across the second data link 46.

Moreover, pressure balancing between the control valves 20-30 can be accomplished at a much higher rate than attempting to balance pressures across the various control valves 20-30 through the corresponding flight controller 32, 34, and 36.

The second data link 46 communicates all the information that is received at one actuator remote processing unit 40, 42 and 44 with each of the other actuator remote processing units 40, 42 and 44. This sharing and visibility of information further provides built in fault and test functionality. Pressures and differences in pressure between all of the control valves 20-30 can be compared and a faulty control valve 20-30 can be identified if desired values as compared to the other control valves 20-30 are outside of defined tolerances. It should be understood, that although the example system is described as including hydraulic control valves 20-30, other control devices that provide other types of information could also benefit from the disclosed system architecture.

Accordingly, the example flight control system 10 includes a second data link between remotely located actuator remote processing units to enable a sharing of information at higher rates and provided increased functionality even in the event of any individual failure. Moreover, the improved control architecture enables improved pressure balancing of the redundant control valves at a higher rate and efficiency.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A flight control system comprising:
an actuator including a first stage controlled by a plurality of first stage control valves and a second stage controlled by a plurality of second stage control valves;
a first flight controller and a second flight controller generating position commands indicative of a desired position of the actuator required to move a flight control surface to a desired position;
a first data link between the first flight controller and the second flight controller communicating information between the first flight controller and the second flight controller;
a first actuator remote processing unit and a second actuator remote processing unit receiving position commands from a corresponding one of the first flight controller and the second flight controller, the first actuator remote processing unit generating commands for actuating one of the plurality of first stage control valves and one of the plurality of second stage control valves controlling the first stage and the second actuator remote processing unit generating commands for actuating another of the plurality of first stage control valves and another of the plurality of second stage control valves based on the received position commands;
a first sensor and a second sensor communicating information indicative of actuator operation to a corresponding one of the first actuator remote processing unit and the second actuator remote processing unit; and
a second data link between the first actuator remote processing unit and the second actuator remote processing unit communicating data received from the first sensor to the first actuator remote processing unit and data received from the second sensor to the second actuator remote processing unit independent of the first and second flight controllers, wherein the first actuator remote processing unit generates commands for one of the first plurality of first stage control valves and one of the plurality of second stage control valves and the second actuator remote processing unit generates commands for a second one the plurality of first stage control valves and a second one of the plurality of second stage control valves based further on the data received from the other of the actuator remote processing units shared over the second data link.

2. The flight control system as recited in claim 1, wherein each of the first and second actuator remote processing units comprise a pair of actuator remote processing units for controlling one of the plurality of first stage control valves and one of the plurality of second stage control valves.

3. The flight control system as recited in claim 2, including a third flight controller generating position commands indicative of a desired position of the actuator and a third actuator remote processing unit comprising a pair of actuator remote processing units generating commands based on the received position commands from the third flight controller, wherein the third actuator remote processing unit communicates information with the first and second actuator remote processing units through the second data link.

4. The flight control system as recited in claim 1, including a position sensor generating a position signal indicative of a position of the actuator, wherein the position signal is communicated through the first and second actuator remote processing units to the first and second controllers and between the first and second actuator remote processing units through at least the second data link.

5. The flight control system as recited in claim 1, wherein the actuator comprises a dual stage electro-hydraulic actuator.

6. The flight control system as recited in claim 5, wherein each of the first and second sensors comprises a pressure sensor communicating a value indicative of hydraulic pressure to the corresponding actuator remote processing unit.

7. The flight control system as recited in claim 1, including communicating a condition of the actuator between the first and second actuator remote processing units over the second data link and comparing the communicated condition reported by each of the first and second actuator remote processing units to detect an aberrant condition.

8. The flight control system as recited in claim 7, including comparing data obtained from the first and second sensors between the first and second actuator remote processing units for detecting an aberrant reading from one of the first and second sensors.

9. A method of controlling a control surface of an aircraft comprising:
generating separate position commands indicative of a desired position of a common control surface with at least two independently operable flight controllers;
communicating information by way of a first data link between the at least two independently operable flight controllers;
receiving the position command from each of the flight controller with a corresponding actuator remote processing unit and generating a command signal for an actuator;
receiving feedback information indicative of actuator operation with the actuator remote processing unit;
communicating feedback information indicative of actuator operation through a second data link between each of the actuator remote processing units; and
modifying the command signals for the actuator generated by the actuator remote processing unit responsive to information obtained through the second data link, wherein the actuator comprises a first stage and a second stage and each of the actuator remote processing units comprises a pair of actuator remote processing units each generating command signals for a control valve associated with one of the first stage and the second stage.

10. The method as recited in claim 9, including the step of controlling one of a plurality of control valves with each actuator remote processing unit and receiving information indicative of pressure and control valve position with each actuator remote processing unit through the second data link.

11. The method as recited in claim 10, including comparing information indicative of operation of each control valve and determining that one of the plurality of control valves is not operating as desired responsive to information indicative of operation for one of the plurality of control valves differing from the other controls valves beyond a desired tolerance range.

12. The method as recited in claim 9, including sensing a position of the actuator utilizing a position sensor and communicating the position of the actuator back to each of the actuator remote processing units through a feedback loop and across the second data link.

* * * * *